United States Patent [19]

McMahan et al.

[11] 4,413,856

[45] Nov. 8, 1983

[54] HARDBAR ENERGY ABSORBING BUMPER SYSTEM FOR VEHICLES

[75] Inventors: David R. McMahan; Gary P. Zeller, both of Anderson; Ronald W. Slaughter, Pendleton; Martin D. Skirha; Dean M. Bayer, both of Anderson, all of Ind.

[73] Assignee: General Motors Corporation, Detroit, Mich.

[21] Appl. No.: 290,827

[22] Filed: Aug. 7, 1981

[51] Int. Cl.³ .............................................. B60R 19/04
[52] U.S. Cl. .................................... 296/188; 293/110; 293/120; 293/132; 296/189
[58] Field of Search ............... 293/107, 109, 110, 120, 293/132, 135; 296/188, 189

[56] References Cited

U.S. PATENT DOCUMENTS

| 3,801,087 | 4/1974 | Akaike | 293/1 |
| 3,997,207 | 12/1976 | Norlin | 293/110 |
| 4,029,350 | 6/1977 | Goupy | 293/71 R |
| 4,278,282 | 7/1981 | Roubinet | 293/135 |

Primary Examiner—Bruce H. Stoner, Jr.
Assistant Examiner—John A. Carroll
Attorney, Agent, or Firm—Charles R. White

[57] ABSTRACT

A substantially rigid bumper is mounted to vehicle frame by special spring brackets which allow bumper movement relative to frame on impact. Cellular energy absorbing media housed within the brackets absorb impact energy and cooperate with bracket for improved bumper support.

5 Claims, 5 Drawing Figures

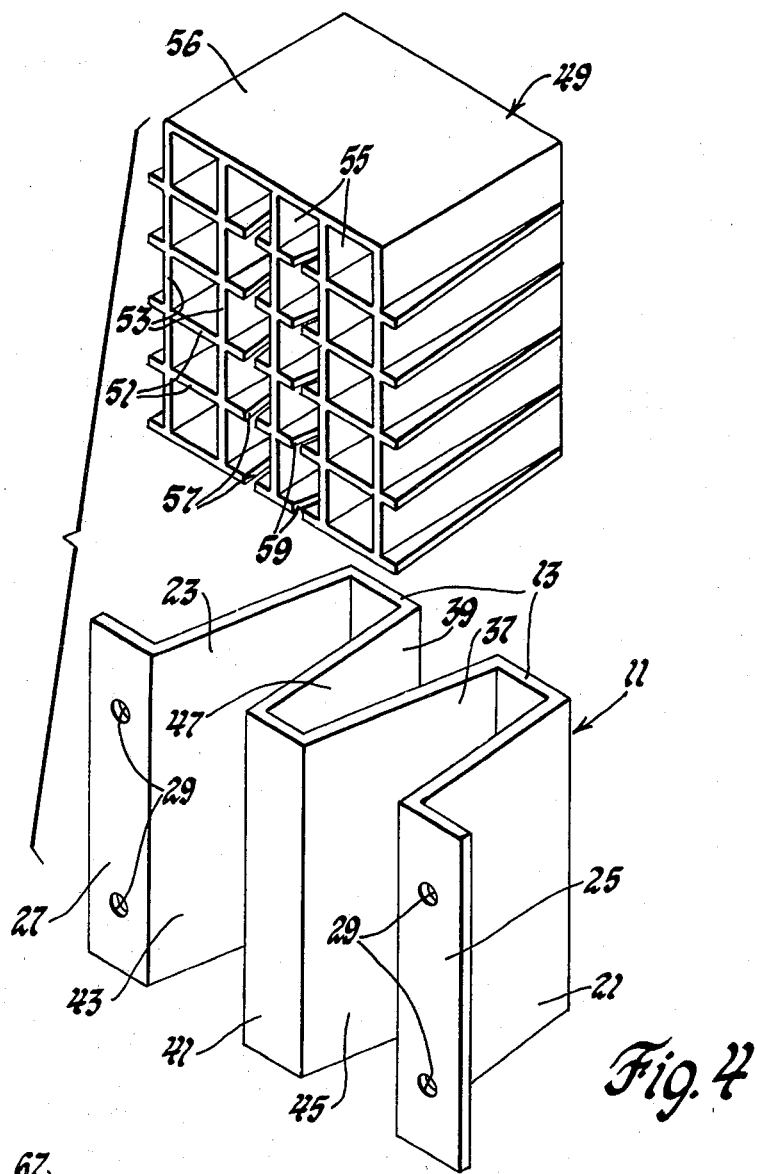
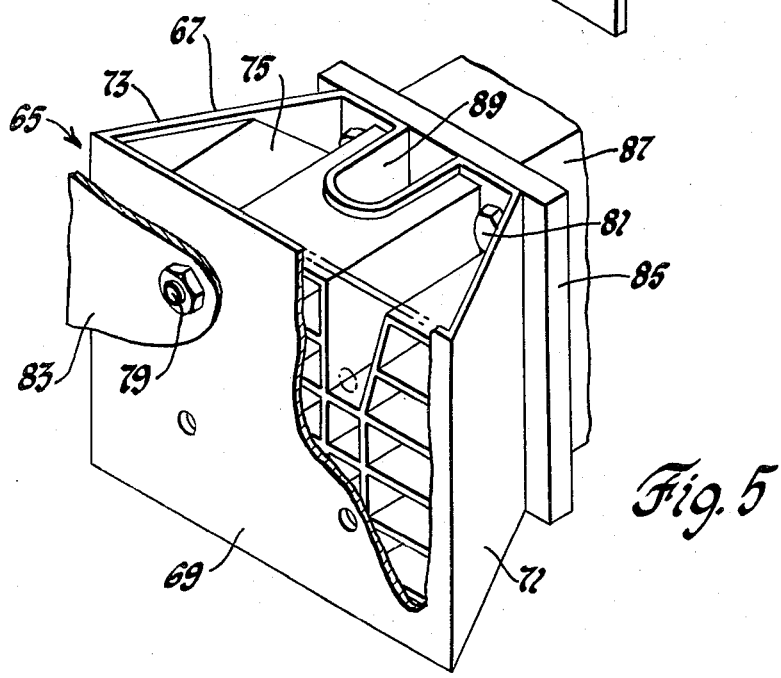

HARDBAR ENERGY ABSORBING BUMPER SYSTEM FOR VEHICLES

This invention relates to energy absorbing vehicle bumper systems and more particularly to a new and improved hardbar bumper and energy dissipating mounting unit therefor which allows the bumper to stroke on predetermined impact and which returns the bumper to its original position after removal of impact load.

Prior to the present invention, a wide variety of energy absorber units have been utilized to movably mount hardbar bumper assemblies to the vehicle frame or to unibody construction. Some of these units comprise telescoping inner and outer cylinders or equivalent components that are movable from an extended position to a telescoped position in response to the application of predetermined impact loads to the bumper assembly. Various energy absorbing mediums such as viscous fluid, spring devices or stretchable bands of plastic material have been employed with good success for dissipating impact energy and for returning the bumper assembly to its original position after removal of impact loads. While these energy absorber devices have adequately performed in absorbing impact energy, they are generally elongated for optimized energy absorption stroke, complex in construction and difficult to build and service. Additionally, some of these units require extensive variation and build up of vehicle frame or other support structure for the energy absorbing units which added undesired weight to the vehicle.

The present invention incorporates a new and improved lightweight and economical energy absorber and support bracket unit for mounting a hardbar bumper to a vehicle frame in a manner which permits the hardbar to be stroked on impact and crowded toward support structure so that the energy absorber can effectively be flexed to dissipate impact energy. After removal of the impact load, the bumper mounting unit returns the hardbar bumper to its pre-impact position without appreciable damage to the hardbar bumper or the bumper mounting unit.

In this invention, the bumper mounting unit comprises a multicelled energy absorbing media housed within a special spring bracket that surrounds a portion of the media and which supports the hardbar bumper in the X, Y and Z coordinate planes in space. One end of the spring bracket of the energy absorber unit is attached to the vehicle side rails or other support structure and the opposite end is attached to the rear (or face mount) of the hardbar bumper. In normal operation the hardbar is supported outwardly of the vehicle body primarily by the spring bracket so that it is in position to move in the X, Y and Z planes and provide effective protection for vehicle body work and components. Bumper displacement toward the vehicle frame causes the twisting and buckling of the cells of the energy absorbing media for the dissipation of impact energy. The walls of the bumper supporting spring bracket are deflected while supporting the hardbar bumper at its effective height. When completely deflected, the energy absorber media has dissipated a predetermined quantity of impact energy for effective dissipation of such energy. After removal of the impact loads, the spring bracket in combination with the energy absorbing media will return the bumper assembly to its pre-impact position at a control return velocity.

It is a feature, object and advantage of this invention to provide a new and improved energy absorbing unit which is particularly suitable for mounting a hardbar bumper to a vehicle chassis frame or other support and which incorporates a minimal number of components to provide a lightweight and highly effective energy absorber that supports the bumper at a predetermined curb height and which is active in response to the movement of the bumper and vehicle body toward one another in an impact situation to absorb impact energy with the twisting and deflection of the walls of cells of cellular energy absorbing media of the unit.

Another feature, object and advantage of this invention is to provide a new and improved hardbar energy absorbing bumper system having a resilient multicellular energy absorber backing the hardbar bumper and having a special spring bracket housing and retaining the energy absorber and which supports the bumper at predetermined curb height and which deflects in a manner which does not intrude into the cellular media so that the media can absorb impact energy according to design. On removal of impact loads, the energy absorber recovers to its original configuration and the force of recovery of the bracket and energy absorbing medium returns the bumper system to its original position for subsequent service in vehicle protection.

It is another feature, object and advantage of this invention to provide a hardbar energy absorbing bumper system for vehicles incorporating a pair of energy absorbing units each having cellular energy absorbing media housed within a support spring which provides support for a hardbar bumper assembly and which deflects on application of an impact load to the bumper causing the vehicle and bumper to move toward one another for dissipating impact loads. Upon removal of impact loads, the force of recovery of the units moves the bumper in a controlled manner outwardly while continuing support of the bumper at a predetermined curb height.

These and other features, objects and advantages of this invention will be more apparent from the following detailed description and drawing in which:

FIG. 4 is a perspective view of one of the energy absorbing components of FIG. 1, and FIG. 5 is a perspective view of an alternate design of the energy absorbing units of FIG. 1.

Figure 1:
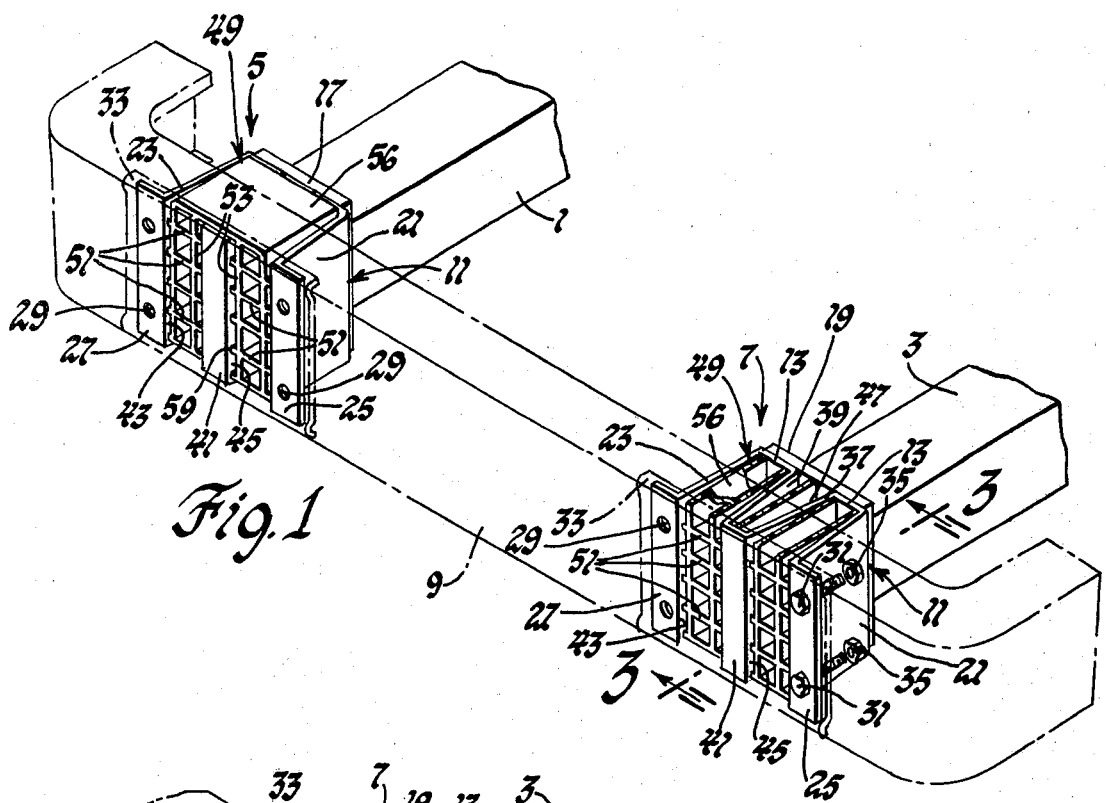
FIG. 1 is a perspective view of an energy absorbing bumper system for a vehicle with parts broken away and portions in phantom line.

Referring now in greater detail to the drawing, there is shown in FIG. 1 the front portion of a wheeled vehicle frame illustrated by the ends of laterally spaced side rails 1 and 3 having mounted at their outer ends identical energy absorbing units 5 and 7. A laterally extending hardbar bumper assembly 9 of metal or other material is in turn mounted at a predetermined height above road level to the front of the energy absorber units 5 and 7. The bumper supporting energy absorbing units flex to permit the stroking movement of the bumper assembly relative to the supporting side rails on both front and side for angular impacts. The plastic deformation of the units dissipate impact energy and the elastic recovery properties of the unit return the bumper assembly to a pre-impact position after removal of impact loads preferably at a slow rate of recovery.

Figure 2:
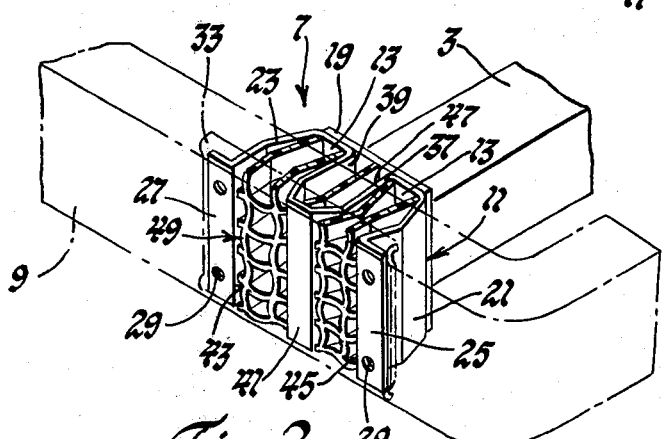
FIG. 2 is a portion of the energy absorbing bumper system of FIG. 1 illustrating the energy absorbing unit of the bumper system being deflective under impact load.
Figure 3:
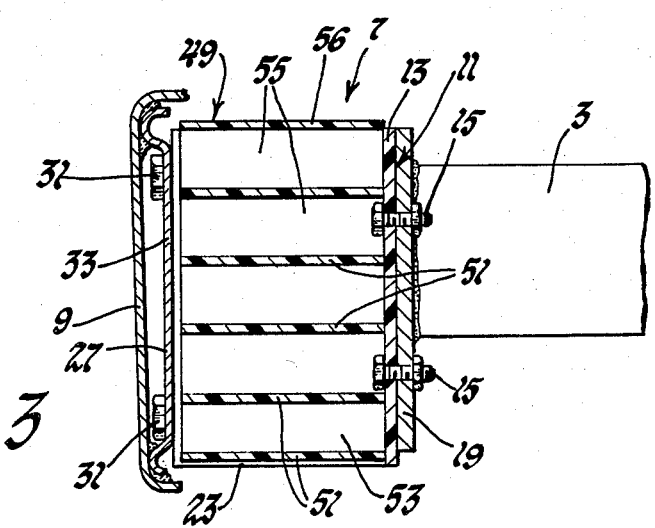
FIG. 3 is a cross-sectional view taken along lines 3—3 of FIG. 1.

The energy absorber assemblies 5 and 7 are identical and each comprises a bumper support bracket 11 of a suitable engineered plastic, thermoset fiberglass or spring steel material. In a preferred embodiment shown in FIGS. 1, 2 and 4, the bracket is W-shaped in cross-section and provides sufficient support of the bumper to accommodate the elevating force of a suitable jack so that the vehicle may be raised for tire change or other service work. The bracket 11 is a spring device that is designed to return to at least 95% of its original shape after impact and allow bumper displacement from side and corner impacts. The flat rear walls 13, 13 of the bracket 11 are formed with openings for reception of threaded fasteners 15 which secure the bracket to the support plates 17, 19 welded or otherwise fixed to the end of the associated side rail 1 or 3. The bracket 11 has side legs 21, 23 angled outwardly from the associated rear wall 13, 13 to left and right laterally extending forward flanges 25, 27. These flanges have openings 29 for reception of fasteners 31 that extend rearwardly from retainer 33 welded or otherwise affixed to the rear or face of the bumper beam. Nuts 35 are advanced onto fasteners 31 to a tightened position to hold the bumper assembly to the bracket. In addition to the two side walls, the bracket has two interior walls 37 and 39 which extend from the back walls 13 in a converging manner to a central front web 41 which is disposed adjacent to the retainer 33 or beam section. These walls cooperate to form the W-shaped cross-section configuration and thereby provide three tapered pockets 43, 45, and 47 (FIG. 4) for reception, retention and stroke control of the resilient energy absorbing media 49.

In the preferred form, the energy absorbing media 49 is a block-like cellular matrix having a plurality of laterally and vertically extending walls 51, 53 which intersect one another to form a plurality of longitudinally extending cells 55. The walls and the columns formed by the intersection of the walls deflect on bumper impact to dissipate impact energy as explained below. The energy absorbing media is made from a suitable olefin material or other resilient material which after deflection is recoverable at a slow rate to an original pre-impact position. Except for the top wall 56, the laterally extending walls 51 of the media are cut at 57 and 59 to form three sections tapered lengthwise to closely fit into pockets 43, 45 and 47. The three sections or segments of the media are hinged to the top wall so they can be spread apart and inserted downwardly into the pockets of the brackets as indicated in FIG. 4. The bracket with the energy absorbing media installed therein in close fitting manner provides improved support of the bumper, particularly on side impacts where the bracket may, by itself, have a tendency to flex and permit excessive lateral movement of the bumper. Thus, the energy absorbing media installed within the bracket provides a strengthening function to resist such movement. The media also controls deflection of walls 37 and 39, and assures recovery of bracket 11.

Impact loads experienced by the bumper result in relative movement of bumper and side rails. Impact energy is dissipated as the walls and wall intersection of the cellular media twist and buckle and the side walls of the brackets spring laterally. Preferably the cellular media dissipates a large percentage of the energy as the spring brackets 11 stores the small remainder. Subsequent to impact, the bracket substantially recovers to its original shape and returns the bumper to its pre-impact position. The recovery rate of the bracket may be controlled by the deflected energy absorbing media when attached between the bumper and the side rails as illustrated in FIGS. 1-4.

FIG. 5 shows an alternate design of an energy absorbing unit used to yieldably mount a hardbar bumper assembly to the vehicle frame or other suitable support structure. This unit 65 comprises an outer support bracket 67 similar to bracket 11 and is preferably made of a suitable plastic, fiberglass or spring steel material. The bracket is a spring device and is generally trapezoidally shaped in cross-section with an outer end wall 69 connecting the outwardly flared side walls 71, 73 to form an enclosure for the energy abosrbing media 75. This energy absorbing media is an open-celled unit having properties like that of media 49. The media is shaped to closely fit within the envelope formed by bracket 67. The front and rear walls of the bracket 67 carry threaded fasteners 79, 81 for attachment to the bumper beam 83 and suitable support structures 85 and 87 of the vehicle frame.

As shown, the support bracket has a foreshortened U-shaped central leg portion 89 which serves to increase spring rate to dissipate high impact loads controlling the relative movement of the side rails and bumper bar. This leg portion also controls lateral movement of the unit and also may act as a stop for the stroke of the assembled unit. The cells of the media are longitudinally extending, however. If desired, the cells of the media may extend vertically to provide lower load energy absorber. The design of FIG. 5 may provide a double-acting or dual rate energy absorber with the cellular media deflecting on very low loads applied to the bumper for improved protection on minor impacts. On increased loads, the central leg deflects to provide a high rate energy absorber for fully dissipating the energy of a 5 MPH vehicle impact, for example.

While a preferred embodiment of the invention has been shown and described, other modifications will become apparent to those skilled in the art. Accordingly, the scope of this invention is set forth in the following claims.

The embodiments of the invention in which an exclusive property or privilege is claimed are defined as follows:

1. In a vehicle, an energy-absorbing unit for mounting a rigid, laterally-extending vehicle bumper assembly to substantially rigid support structure of the vehicle, said energy absorbing unit comprising a resilient mounting bracket having at least one pair of longitudinally extending and laterally spaced side wall portions interconnected at one end by an end wall, said bracket forming a vertically extending opening, at least one of said side wall portions having attachment means formed adjacent the other end thereof, first and second fastener means extending respectively through said end wall and said attachment means for connecting said mounting bracket to said bumper assembly and for connecting said rigid support structure of said vehicle so that a portion of said vehicle can be lifted by a predetermined vertical force exerted on said bumper assembly, and a discrete resilient energy absorbing medium having a plurality of longitudinally extending cells, said medium being in said opening and separate from said bracket and housed within the confines of said walls of said bracket between said bumper assembly and support structure for deflecting and absorbing impact energy from an impact load laterally springing said sidewalls of said bracket and displacing said bumper assembly from a pre-impact position toward said support structure.

2. In a vehicle, an energy-absorbing unit for mounting an outer, rigid, laterally-extending vehicle bumper assembly to substantially rigid support structure of the vehicle comprising a resilient mounting bracket having at least one pair of laterally spaced side wall portions interconnected at one end by an end wall, at least one of said side wall portions having flange means formed adjacent the other end thereof, first and second fastener means extending respectively through said end wall and said flange means for attaching said mounting bracket to said bumper assembly and to said rigid support structure of said vehicle so that said bumper assembly is mounted to said support structure and so that a portion of said vehicle can be lifted by a predetermined vertical jacking force exerted on said bumper assembly, and a resilient cellular energy absorbing medium separate from said bracket and interposed within the confines of said walls of said bracket for providing support of the bumper on corner impacts applied thereto and for deflecting and absorbing impact energy from a frontal impact load displacing said bumper assembly from a pre-impact position toward said support structure and for subsequently controlling movement of said bumper assembly back to its pre-impact position after the impact load is removed.

3. In a vehicle, an energy-absorbing unit for mounting a rigid, bumper assembly outwardly of and across one end of the vehicle to substantially rigid support structure of the vehicle comprising a resilient mounting bracket having at least one pair of laterally spaced side wall portions interconnected at one end by an end wall, at least one of said side wall portions having attachment means formed adjacent the other end thereof, first and second fastener means extending respectively through said end wall and said attachment means for connecting said mounting bracket to said bumper assembly and to said rigid support of said vehicle, and a discrete resilient energy absorbing medium separate from said bracket and interposed within the confines of said walls of said bracket for deflecting and absorbing impact energy from an impact load displacing said bumper assembly from a pre-impact position toward said support structure, and said mounting bracket having leg means for increasing the spring rate of the unit.

4. An energy absorber unit adapted to operatively connect a hard bar bumper to a vehicle comprising a resilient bumper support bracket having laterally spaced exterior side walls and a pair of interior walls spaced from one another and from said side walls, front web means connecting a forward portion of said interior walls to one another and back wall means connecting a first interior wall to one side wall and a second interior wall to the other side wall to thereby form a plurality of upwardly opening pockets, a resilient and discrete energy absorber separable from said bracket comprising a plurality of sections which are shaped to correspond with and which fit within said pockets, each of said sections having a plurality of resilient walls which interesect one another to form a plurality of open cells, said walls of said bracket laterally deflecting in response to an impact load while said cells of said energy absorber buckle and twist to absorb impact energy.

5. The energy absorber unit of claim 4 wherein said energy absorber has a top wall and each of said sections is hinged to and depends from said top wall to fit into said upwardly opening pockets.

* * * * *

UNITED STATES PATENT AND TRADEMARK OFFICE
CERTIFICATE OF CORRECTION

PATENT NO. : 4,413,856

DATED : November 8, 1983

INVENTOR(S) : David R. McMahan et al

It is certified that error appears in the above—identified patent and that said Letters Patent is hereby corrected as shown below:

On the title page, add -- Lawrence E. Campen -- as an inventor.

Signed and Sealed this

Nineteenth Day of June 1984

[SEAL]

Attest:

GERALD J. MOSSINGHOFF

Attesting Officer

Commissioner of Patents and Trademarks